United States Patent [19]

Nakamura et al.

[11] Patent Number: 6,069,620

[45] Date of Patent: *May 30, 2000

[54] DRIVING METHOD OF LIQUID CRYSTAL DISPLAY DEVICE

[75] Inventors: Hajime Nakamura; Yasuhiro Kimura; Sueoka Kuniaki, all of Kanagawa-ken; Yoichi Taira, Tokyo; Tatsuo Uchida, Miyagi-ken, all of Japan

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/772,784

[22] Filed: Dec. 20, 1996

[30] Foreign Application Priority Data

Dec. 22, 1995 [JP] Japan .................................. 7-334579

[51] Int. Cl.$^7$ ........................................................ G09G 5/00
[52] U.S. Cl. .............................. 345/214; 345/87; 345/92; 345/99
[58] Field of Search ................................. 345/90–98, 99, 345/87, 107, 212, 213, 214, 215; 349/117, 121, 136, 177

[56] References Cited

U.S. PATENT DOCUMENTS

| | | | |
|---|---|---|---|
| 4,651,148 | 3/1987 | Takeda et al. ............................... | 345/92 |
| 4,818,981 | 4/1989 | Oki et al. .................................... | 345/92 |
| 4,909,602 | 3/1990 | Kaneko et al. ............................. | 345/92 |
| 5,241,408 | 8/1993 | Ishikawa et al. ........................ | 349/117 |
| 5,300,945 | 4/1994 | Iemoto et al. .............................. | 345/92 |
| 5,361,151 | 11/1994 | Sonehara et al. ......................... | 349/117 |
| 5,392,143 | 2/1995 | Akiyama et al. .......................... | 345/93 |
| 5,398,043 | 3/1995 | Takeda et al. .............................. | 345/94 |
| 5,541,753 | 7/1996 | Raynes et al. ............................ | 349/117 |
| 5,627,557 | 5/1997 | Yamaguchi et al. ....................... | 345/90 |
| 5,648,793 | 7/1997 | Chen .......................................... | 345/96 |
| 5,668,651 | 9/1997 | Yamada et al. ........................... | 349/156 |
| 5,694,145 | 12/1997 | Kondo et al. .............................. | 345/90 |
| 5,739,804 | 4/1998 | Okumura et al. .......................... | 345/99 |
| 5,900,854 | 5/1999 | Itoh et al. ................................... | 345/99 |

*Primary Examiner*—Richard A. Hjerpe
*Assistant Examiner*—Henry N. Tran
*Attorney, Agent, or Firm*—Scully, Scott, Murphy & Presser; Jay P. Sbrollini, Esq.

[57] ABSTRACT

The present invention relates to a driving method of a liquid crystal display device using an OCB (optically compensated birefringence) which realizes a wide view-field angle and high-speed response, and has an object of providing a driving method of a liquid crystal display device which method causes an OCB cell to transfer from a splay orientation state to a bend orientation state in short time.

In a driving method of a liquid crystal display device using an OCB cell, gate on/off periods of a TFT are controlled at a start of a display operation, each pixel is caused to have bend orientation by a strong electric field that is generated between a gate electrode and a common electrode, and, at the same time, a voltage that is higher than that to generate an electric field necessary to maintain bend orientation is applied between a display electrode and the common electrode, to thereby effect transfer to bend orientation in short time.

9 Claims, 6 Drawing Sheets

DRIVING METHOD OF LIQUID CRYSTAL DISPLAY DEVICE

BACKGROUND OF THE INVENTION

1. Technical Field

The subject invention relates to a driving method of a liquid crystal display device and, more specifically, to a driving method of a liquid crystal display device using an OCB (optically compensated birefringence) technique which realizes a wide view-field angle and high-speed response.

2. Prior Art

Twisted nematic (TN) cells, which at present are widely used in TFT color liquid crystal display devices (TFT/LCDs), have a small view-field angle, which results in a problem that when an LCD panel surface is viewed from an oblique direction, the contrast decreases and image inversion occurs. To solve this problem, i.e., to realize a wide view-field angle, various methods have been proposed. Among those methods is an orientation division method in which each pixel of an LCD is divided into two parts and orientation is effected in different directions in the two parts, and a method in which a pixel electrode is divided into a plurality of parts.

Further, to accommodate a recent trend of multimedia, a motion picture processing function is now necessary which allows a vast amount of image data to be moved on the screen of a liquid crystal display device at high speed. To this end, it is desired that the high-speed response performance of liquid crystal display cells be improved.

In recent years, studies on an OCB cell that is to be used as a liquid crystal cell instead of a TN cell have been made. If the OCB cell technique is used, it becomes possible to obtain a wide view-field angle more easily than with the orientation division method as well as a high-speed response characteristic that is one-order faster than with conventional TN cells. FIG. 13 is a perspective view illustrating the structure of an OCB cell. A liquid crystal material that exhibits bend orientation is sealed between two (top and bottom) glass substrates. Polarizing plates are disposed outside the two respective glass substrates. A phase difference compensation film is disposed between one of the two glass substrates and the polarizing plate.

The bend orientation is orientation in which liquid crystal molecules exist almost only in, for instance, the XZ plane in the coordinate system shown in the figure. In a bend orientation cell, since top and bottom liquid crystal molecules are always oriented symmetrically even if the application voltage is varied, the view-field-angle dependence is symmetrical in the XZ plane. And phase differences in the three-dimensional directions of X, Y and Z are made zero by using the phase difference compensation film (bi-axial film), to obtain a wide view-field angle.

An OCB cell is in a splay orientation state when no bias voltage is applied to it, and exhibits a bend orientation state when a given high voltage is applied to it. To allow an OCB cell to operate as a liquid crystal display device, at a start of operation it needs to be rendered into a bend orientation state from a splay orientation state.

Although they are still in a research stage, there have been started studies on methods of making an OCB cell in a bend state by applying a high voltage between a common electrode and pixel electrodes for a given period at the start of operation of a liquid crystal display device using the OCB cell. However, there occurred unsuccessful cases in which more than several tens of seconds took to attain a bend orientation state, or part of pixels are left untransferred to a bend orientation state. Where an OCB cell does not transfer to a bend orientation state, it is possible for an operator to forcibly attain a bend orientation state by pushing the surface of a region concerned of an LCD panel by his finger. Although this allows the liquid crystal display device to have a desired wide view-field angle characteristic, the image quality required for it cannot be obtained easily. Further, the above measure is not practical.

There is another problem that even if transfer from splay orientation to bend orientation is effected at a start of operation, for a certain reason the OCB cell may return to a splay orientation state during the operation, in which case normal display is not performed unless the power is turned on again.

Recent battery-driven systems such as notebook-type personal computers equipped with a TFT color liquid crystal display device are increasingly required to be of a power-saving type. To attain power-saving, such a liquid crystal display device is provided with a function of stopping it's driving mode to turn off display if, for instance, the system receives no input for a given period. The liquid crystal display device is adapted to instantaneously turn on display upon reception of a signal from the system. However, once drive signals are turned off, an OCB cell returns to a splay orientation state from a bend orientation state. Therefore, certain period is needed to restore the bend orientation state, thus display cannot be turned on instantaneously.

SUMMARY OF THE INVENTION

An object of the subject invention is to provide a driving method of a liquid crystal display device which method allows an OCB cell to transform from a splay orientation state to a bend orientation state in a short period in a TFT/LCD using the OCB cell.

Another object of the invention is to provide a driving method of a liquid crystal display device which forcibly returns an OCB cell to a bend orientation state in a short period when it has transformed from a bend orientation state to a splay orientation state during image display.

A further object of the invention is to provide a driving method of a liquid crystal display which maintains a bend orientation state during operation and during suspension of operation of a liquid crystal display device.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS OF THE INVENTION

Figure 1:
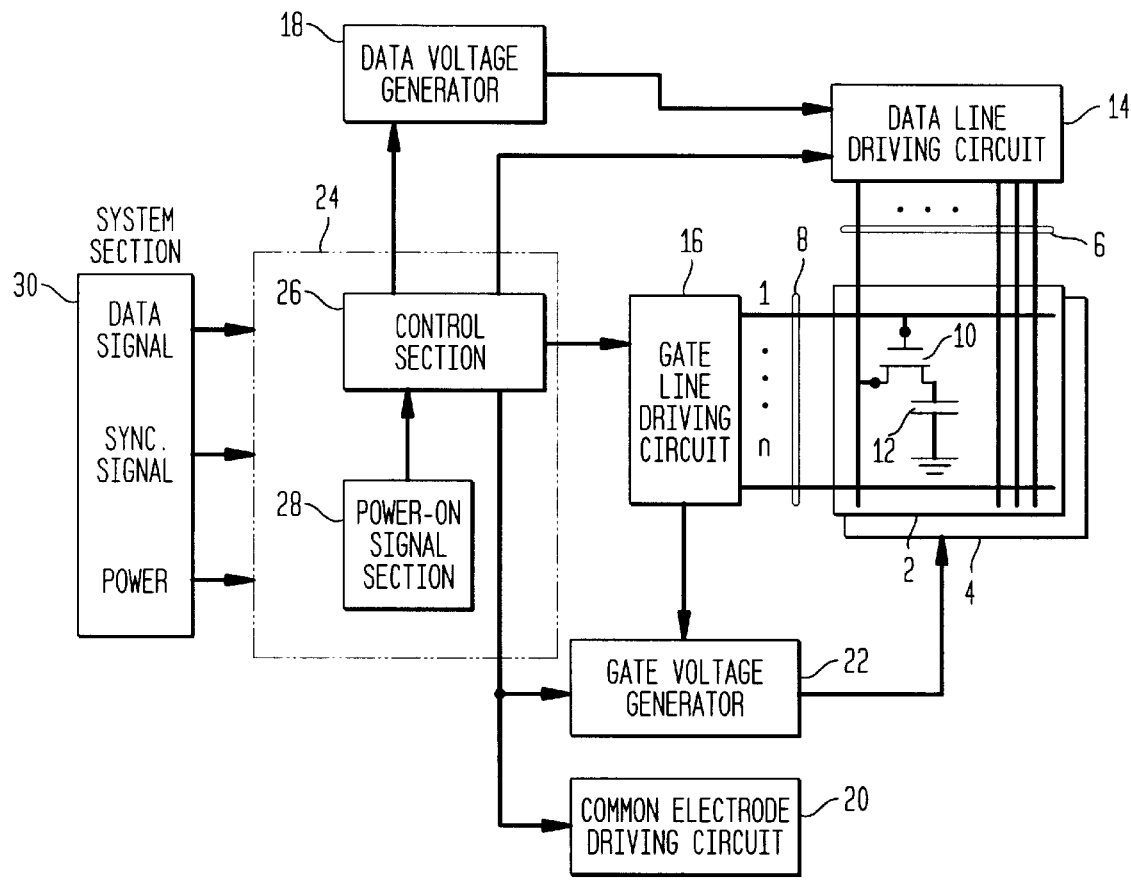
FIG. 1 shows a configuration of a liquid crystal display device according to an embodiment of the present invention.

The above objects can be attained by the following driving methods.

There is provided a driving method comprising the steps of controlling gate on/off periods of a TFT at a start of a display operation of a liquid crystal display device using an OCB cell; causing each pixel to have bend orientation by a strong electric field that is generated between a gate electrode and a common electrode; and applying, at the same time, a voltage that is higher than a voltage necessary to continue bend orientation between a display electrode (pixel electrode) and the common electrode, to thereby effect transformation to bend orientation in short time.

There is provided a driving method comprising the steps of applying a voltage pulse between a storage capacitance electrode of a TFT and a common electrode at a start of a display operation of a liquid crystal display device using an OCB cell; causing each pixel to have bend orientation by a strong electric field that is generated between the two electrode; and applying, at the same time, a voltage that is higher than that to generate an electric field necessary to maintain bend orientation between a display electrode (pixel electrode) and the common electrode, to thereby effect transfer to bend orientation in a short period.

In the above driving methods, the driving mode is started in response to a power-on reset signal sent from a system side.

If transfer from bend orientation to splay orientation occurs during the display operation for a certain reason, the display quality is lowered. To solve this problem, driving similar to the above is performed at given intervals to restore the bend orientation. Driving similar to the above may be performed in response to an external signal sent from a switch or the system side rather than at the given intervals, to thereby restore the bend orientation forcibly.

Further, to maintain an bend orientation state during suspension of operation of the liquid crystal display device, a minimum necessary voltage is applied between the common electrode and the display electrode, and a frame frequency is made lower than in an ordinary display state.

With reference to FIGS. 1–4, a description will be made of a liquid crystal display device, its driving method, and its driving device according to a first embodiment of the subject invention in which an OCB cell is transferred from a splay orientation state to a bend orientation state at a start of operation of the liquid crystal display device.

The configuration of a liquid crystal display device used in this embodiment will be briefly described with reference to FIG. 1. To begin with, an array substrate 2 and an opposed substrate 4, which are glass substrates, are opposed to each other at a given interval through a liquid crystal. Although not shown in the figure, a common electrode is formed over the almost entire surface of the opposed substrate 4. A common electrode driving circuit 20 is connected to the common electrode to apply a voltage to it.

A plurality of data lines 6 and a plurality of gate lines 8 that intersect the data lines 6 are formed on the array substrate 2. Pixel electrodes 12 are formed in respective pixel regions that are sectioned in matrix form by the data lines 6 and the gate lines 8. A thin-film transistor (TFT) 10 as a switching element is formed in the vicinity of each intersection of the data lines 6 and the gate lines 8. The data lines 6 are connected to a data line driving circuit 14 and the gate lines 8 are connected to the gate line driving circuit 16. A gate voltage generator 22 is connected to the gate line driving circuit 16.

The data line driving circuit 14, gate line driving circuit 16, gate voltage generator 22, and common electrode driving circuit 20 are connected to a control section 26 of a liquid crystal display controller 24, and controlled by the control section 26 that receives a data signal, a sync signal, etc. from a system section 30. In response to power from the system section 30, a power-on signal section 28 of the liquid crystal display controller 24 sends a reset signal to the control section 26.

With the above configuration, the driving method under consideration is characterized by forming bend nuclei by electric fields that are developed at a start of driving between gate electrodes of the TFTs (thin-film transistors) 10 formed for the respective pixels of the liquid crystal display device and the common electrode formed on the opposed substrate 4 that is opposed to the array substrate 2 on which the TFTs 10 are formed, to thereby cause bend orientation in each pixel.

In general, the amplitude of a gate voltage applied to the gate electrodes of the TFTs is about 20–30 V, which is much larger than a potential difference of about 6 V between the common electrode on the opposed substrate and the pixel electrodes on the array substrate. Therefore, due to a large potential difference between the common electrode and the gate electrodes, a liquid crystal existing between the common electrodes and the gate electrodes is easily rendered in a bend orientation state. If, at the same time, a voltage higher than that necessary to maintain a bend orientation state between the common electrode and the pixel electrodes is applied, all pixels can be rendered in a bend orientation state in a short period.

Figure 2:
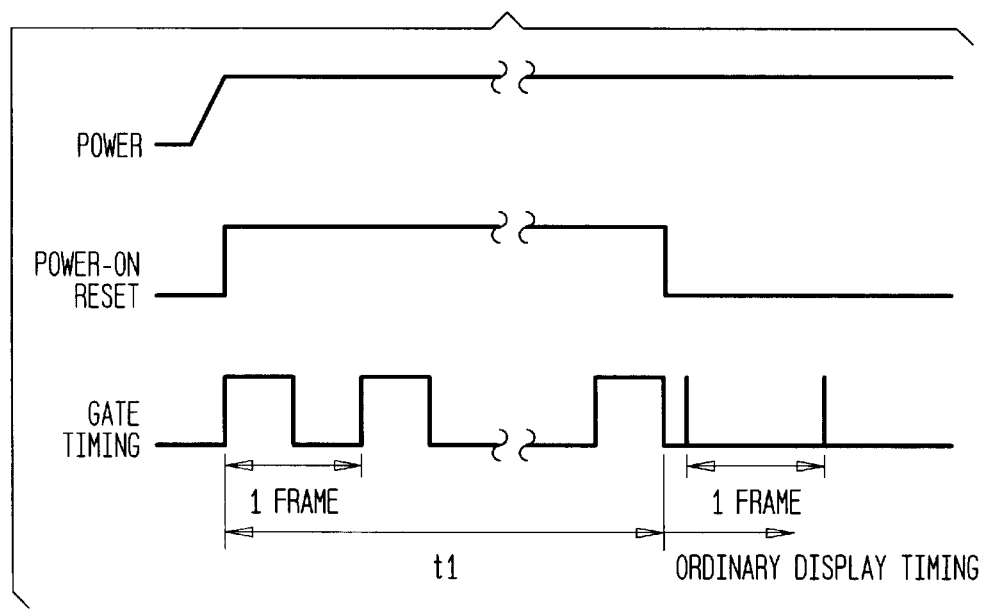
FIG. 2 shows waveform examples of drive timing according to the embodiment.
Figure 3:
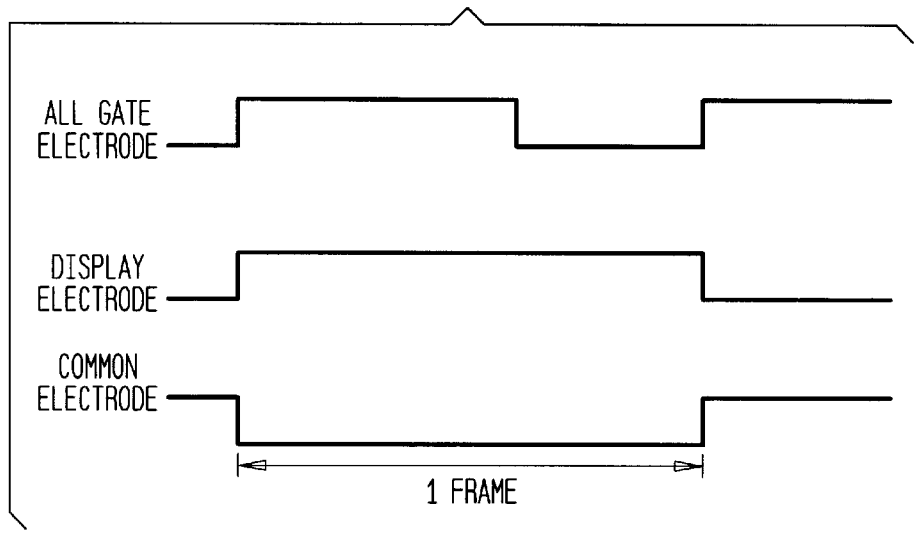
FIG. 3 shows waveform examples of drive timing according to the embodiment.

The driving method according to this embodiment will be described by using timing examples at a start of driving shown in FIGS. 2–4. Referring to FIG. 2, when power starts to be is supplied from the system section 30, the power-on signal section 28 sends a reset signal to the drive control section 26. A period during which the reset signal is output is denoted by t1. Transfer from splay orientation to bend orientation can be effected in short time by controlling, during the period t1, voltages applied to the gate electrodes of the respective TFTs, the display electrodes, and the common electrode.

It is desired practically that the period t1 be not longer than 15 sec. It is preferred that the period t1 be not longer than 5 sec. As shown in FIG. 2, upon the power-on, the power-on reset signal is output for t1 sec, during which the gate lines are supplied with gate pulses whose voltage level is 20–30 V like ordinary gate pulses but whose period is much wider than in ordinary gate timing, as shown in the figure.

The gate timing during the power-on resetting, i.e., during the period t1 will be described with reference to FIG. 3. This example is directed to a method of effecting transfer from splay orientation to bend orientation by simultaneously applying wide gate pulses to all the gate lines. It is assumed that the liquid crystal display device is such that the time to write one picture (one frame) in a case of display by ordinary driving is 17 ms, for instance.

For example, pulses having a duty ratio of 50% (pulse width: about 8.5 ms), which is much larger than in ordinary operation, are generated and simultaneously applied to all the gate lines. Therefore, if t1 is equal to 5 sec, for instance, it includes about 300 frames. Thus, nuclei for bend orientation can be formed by repeatedly causing a large potential difference between the common electrode and the gate electrodes by outputting wide gate pulses 300 times.

By further continuing application of, for instance, a voltage that is applied in a standard driving operation between the common electrode and the display electrodes during the period t1, good bend orientation can be obtained in all pixels in short time.

Figure 4:
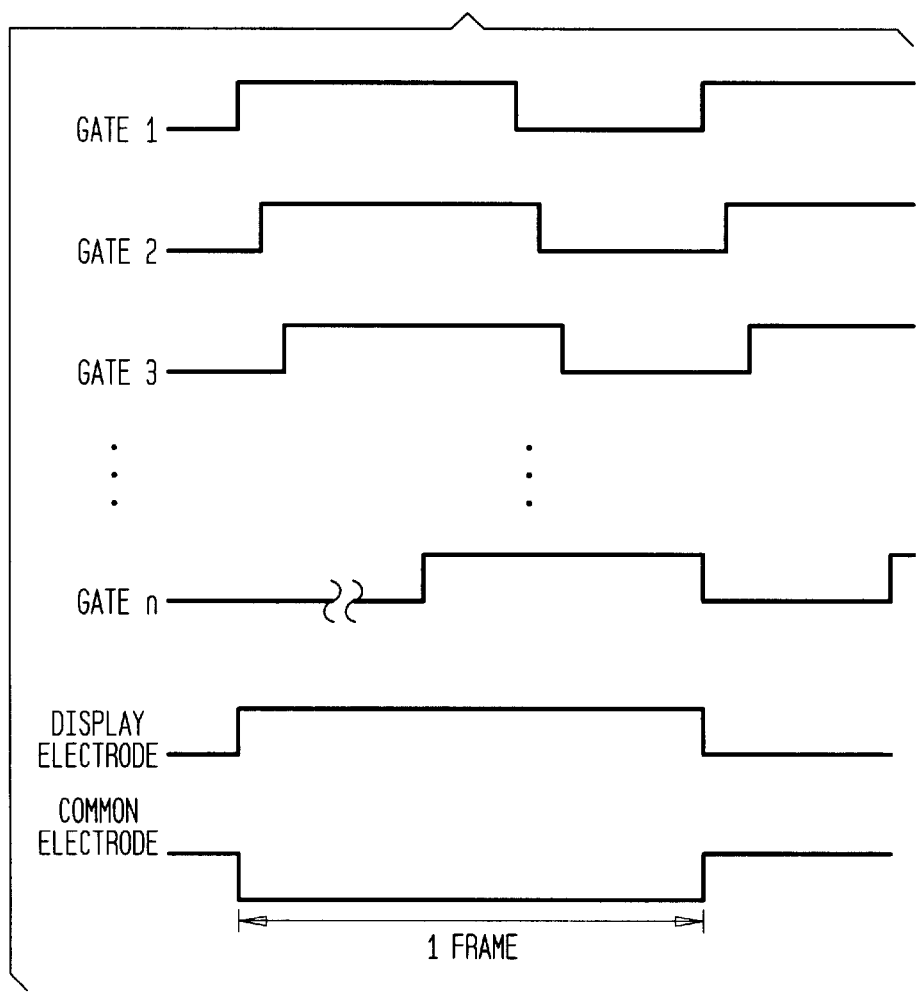
FIG. 4 shows waveform examples of drive timing according to the embodiment.

FIG. 4 shows another gate timing example during the power-on resetting, i.e., during the period t1. In this example, wide gate pulses for bend orientation are sequentially applied to the gate lines in their order. Timings of inputting gate pulses to the respective gate lines are sequentially deviated in each frame.

As described above, in contrast to the fact that in a standard display operation the gate-on period is equal to 1/{(number of display lines)×(frame frequency)} that is as short as several tens of microseconds, in the driving method of this embodiment the gate-on period is set as long as several milliseconds to several seconds. This allows formation of nuclei for bend orientation between the common electrode and the gate electrodes. Further, electric fields developing between the common electrode and the display electrodes cause transfer to bend orientation in all pixels. The transfer to bend orientation can be effected in shorter time as the voltage applied between the common electrode and the display electrodes becomes higher.

Although in the above examples the potentials of the common electrode and the display electrodes are inverted for each frame, they may be inverted once per a plurality of frames as long as no reliability problem occurs. The one-frame period can be set within a range of 12.5 msec to 1 sec (1 to 80 Hz). Further, although both examples of FIGS. 3 and 4 are directed to common electrode inversion driving on a frame-by-frame basis, even where the potential of the common electrode is not inverted the gate electrodes and the display electrodes are driven in the same manner as in this embodiment.

Figure 5:
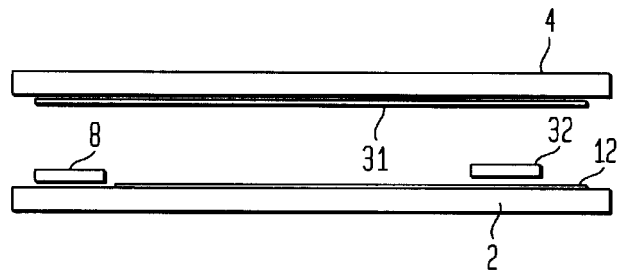
FIG. 5 is a sectional view of a liquid crystal display device in which storage capacitance lines are formed.
Figure 6:
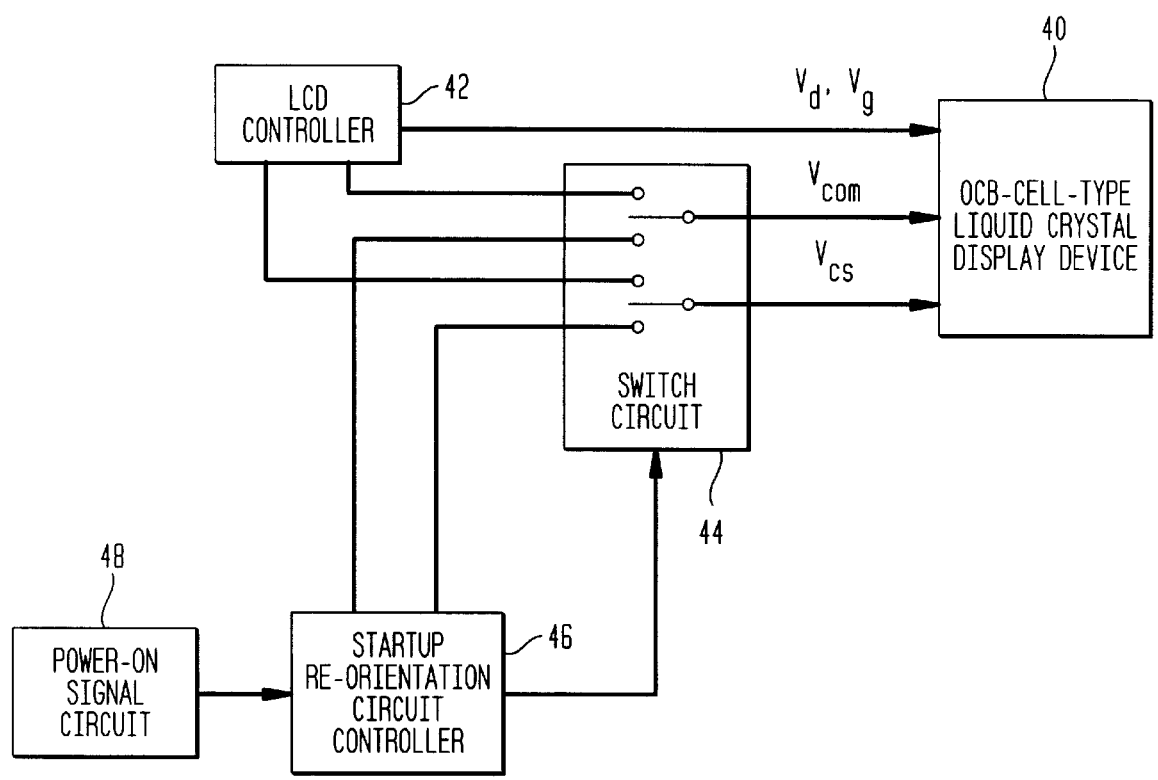
FIG. 6 shows a voltage application circuit according to another embodiment.
Figure 7:
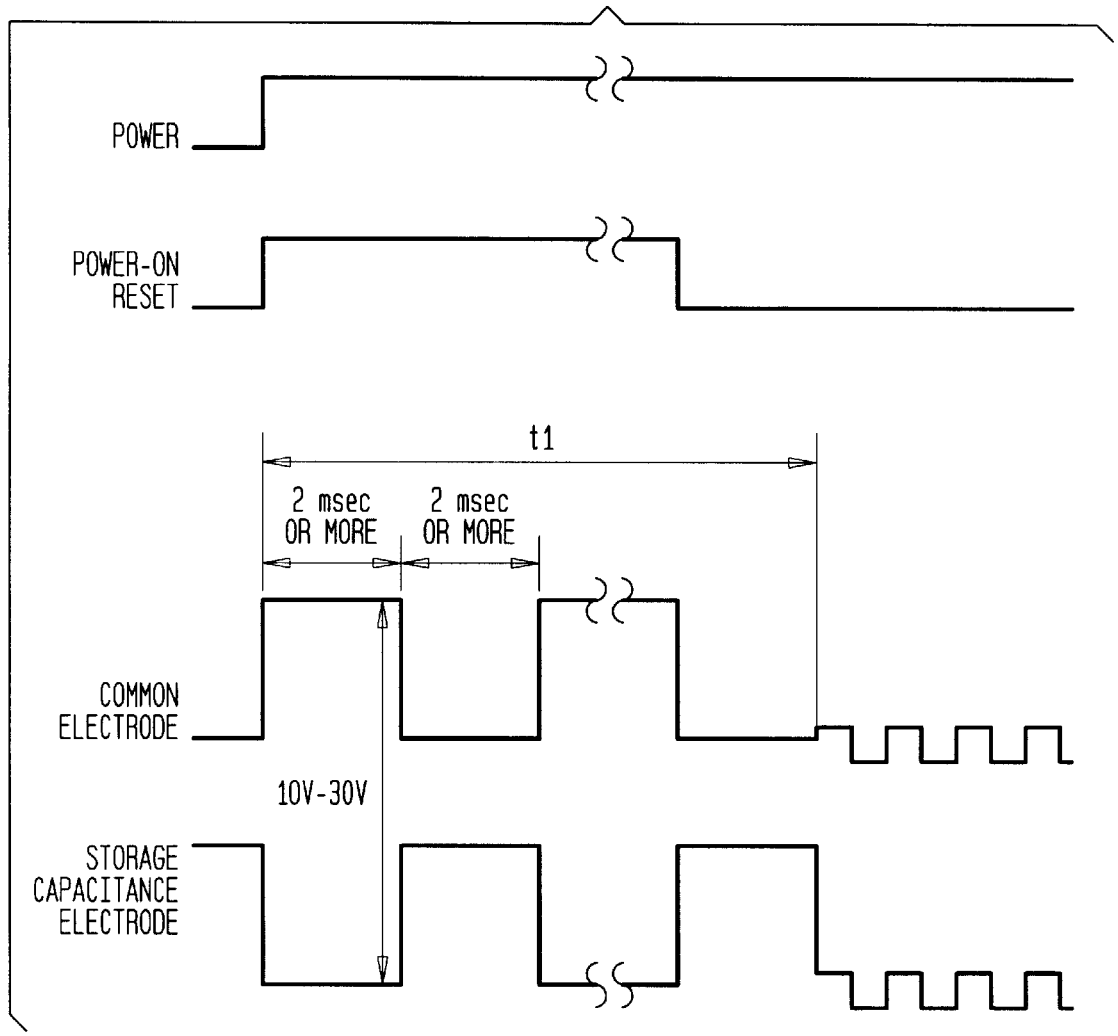
FIG. 7 shows waveform examples of drive timing according to the embodiment.

With reference to FIGS. 5–7, a description will be made of a liquid crystal display device, its driving method, and its driving device according to a second embodiment of the subject invention in which an OCB cell is transferred from a splay orientation state to a bend orientation state at a start of operation of the liquid crystal display device. This embodiment is directed to a driving method for effecting transfer to a bend orientation state in a short period at a start of display operation of a liquid crystal display device using an OCB cell by causing bend orientation in respective pixels by means of strong electric fields developing between a common electrode and storage capacitance electrodes (storage capacitance lines) of TFTs by applying voltage pulses between those electrodes and, at the same time, applying a voltage higher than that to generate an electric field necessary to maintain bend orientation between the common electrode and display electrodes (pixel electrodes).

FIG. 5 is a sectional view showing a liquid crystal display device in which a storage capacitance line is formed. An array substrate 2 and an opposed substrate 4 are opposed to each other so as to seal a liquid crystal 34. A display electrode 12 and a common electrode 31 are formed on the liquid-crystal-side surfaces of the respective substrates. A gate line 8 and a data line (not shown) are formed on the array substrate 2 between the display electrodes 12 of the respective pixels.

A storage capacitance line 32 is formed on the display electrode 12 through an insulating film. In the case of ordinary liquid crystal display driving, a voltage of the same potential as a voltage applied to the common electrode 31 is applied to the storage capacitance line 32.

Next, a voltage application circuit used in this embodiment will be described with reference to FIG. 6. A display (data line) drive voltage Vd and a gate line drive voltage Vg are input from an LCD controller 42 to a liquid crystal display device 40 using an OCB cell. A voltage Vcom to be applied to the common electrode of the liquid crystal display device 40 and a voltage Vcs to be applied to its storage capacitance lines are supplied via a switch circuit 44. The switch circuit 44 switches between Vcom and Vcs coming from the LCD controller 42 and those coming from a startup re-orientation controller 46.

At a start of liquid crystal display, a power-on signal circuit 48 receives a power-on reset signal and forwards it to the startup re-orientation controller 46. Upon reception of the power-on signal, the startup re-orientation controller 46 supplies the switch circuit 44 with a signal for causing it to switch its input switches of Vcom and Vcs to the side of the outputs of the startup re-orientation controller 46.

Now, a driving method according to this embodiment will be described by using a timing example at a start of driving shown in FIG. 7. Referring to FIGS. 5 and 7, when power starts to be supplied from the system, the power-on signal circuit 48 sends a reset signal to the startup re-orientation controller 46. A period during which the reset signal is output is denoted by t1. Transfer from splay orientation to bend orientation is effected in short time by controlling, during the period t1, voltages applied to the storage capacitance lines and the common electrode.

It is desired practically that the period t1 be not longer than 15 sec. It is preferred that the period t1 be not longer than 5 sec. In this embodiment, t1 is set at 1–2 sec. As shown in FIG. 7, upon the power-on, the power-on reset signal is output for t1 sec, during which voltages which are opposite in polarity and different in potential by 10–30 V are applied to the common electrode and the storage capacitance lines, respectively. It is preferred that the potential difference be not shorter than 12 V.

The pulse width needs to be set not shorter than 2 msec to effect transfer to bend orientation. For example, if the pulse on/off ratio is 1:1 (50% duty cycle), the common electrode and the storage capacitance electrodes are inversion-driven at a frequency not higher than 250 Hz as shown in the figure.

If t1 is equal to 3 sec, it includes about 200 frames. Thus, nuclei for bend orientation can be formed by repeatedly applying 200 times pulses that cause a large potential difference between the common electrode and the storage capacitance lines. By further continuing application of, for instance, a voltage that is applied in ordinary driving between the common electrode and the display electrodes during the period t1, good bend orientation can be obtained in all pixels in short time.

Although in this embodiment voltages are applied to both of the common electrode and the storage capacitance lines, a modification is possible in which a voltage is applied to one of those, for instance, the common electrode but no voltages are applied to the storage capacitance lines.

Next, with reference to FIGS. 8–10, a description will be made of a driving method for restoring bend orientation when for a certain reason transfer from bend orientation to splay orientation occurs during display operation of a liquid crystal display device using an OCB cell.

Figure 8:
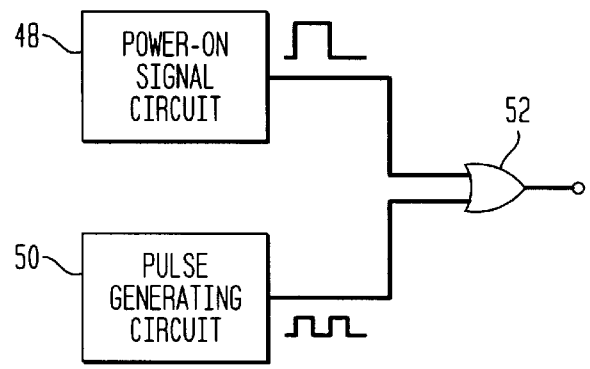
FIG. 8 shows a driving method for effecting return to bend orientation from splay orientation.

In the circuit of the FIG. 8, the output of the power-on signal section 48 of FIG. 1 or the output of the power-on signal circuit 48 which output is connected to the startup re-orientation circuit 46 of the liquid crystal display device shown in FIG. 6 is combined with the output of a pulse generation circuit 50 by means of an OR circuit 52. An output of the OR circuit 52 is input to the startup re-orientation controller 46. The pulse generation circuit 50 is adapted to generate pulses at constant intervals (after a lapse of a given time).

With the above configuration, by virtue of the OR circuit 52, if a pulse is output from the power-on signal circuit 48 or the pulse generating circuit 50, a liquid crystal that has been rendered in a splay orientation state can be returned to a bend orientation state in short time not only at the time of power-on but also during display operation.

Figure 9:
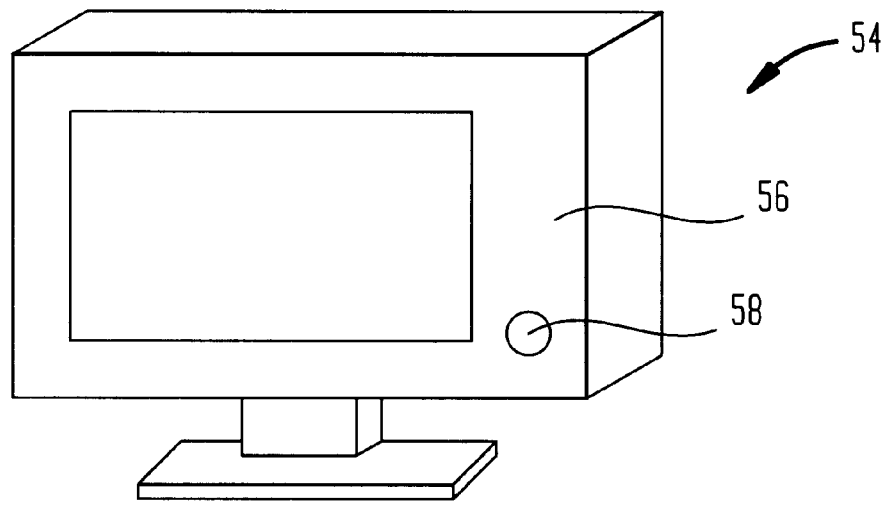
FIG. 9 shows another driving method for effecting return to bend orientation from splay orientation.
Figure 10:
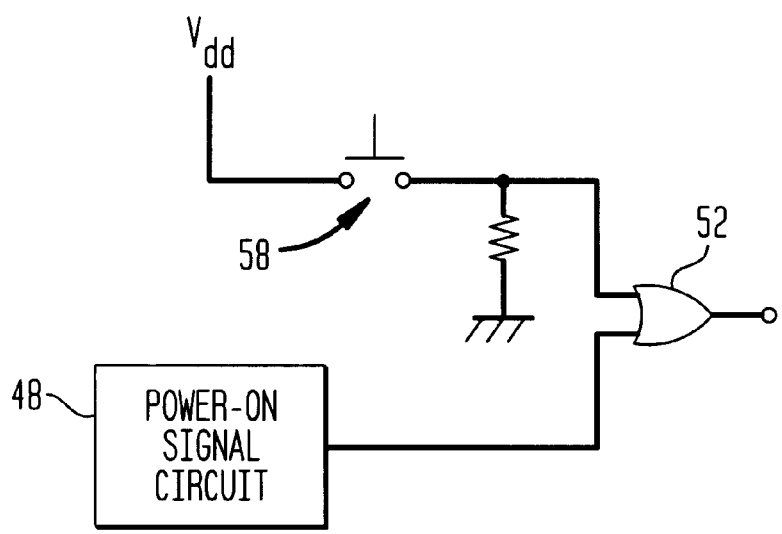
FIG. 10 shows the driving method for effecting return to bend orientation from splay orientation.

Alternatively, as shown in FIGS. 9 and 10, where transfer from bend orientation to splay orientation occurs during display operation, driving may be so made as to forcibly effect transfer to bend orientation in response to a signal that is output from a switch or the system side when necessary to do so, rather than at constant intervals as described above. For example, as shown in FIG. 9, a switch 58 to start driving for forcibly effecting transfer to bend orientation may be provided, for instance, at a position convenient for an operator of the front face of a frame 56 of a display panel of a liquid crystal display device 54. Referring to FIG. 10 showing a configuration example, the switch 58 is adapted to input to the OR circuit 52 or interrupt a voltage Vdd that replaces the pulse generating circuit 50 used in the circuit of FIG. 8. With this configuration, forcible transfer to bend orientation can be effected by closing the switch 58. Instead of using this switch, an external signal may be input to the OR circuit 52 from the system, for instance. For example, forcible transfer to bend orientation can be effected from a system keyboard rather than by the switch 58.

Some of recent notebook-type personal computers, for instance, are provided with a function of automatically causing transition to a power-saving mode if no input occurs from a keyboard or the like for a given period during use of the computer. If the power-saving mode is effected, a backlight of a liquid crystal display device that is a display device of the computer is turned off, or the operation of the backlight and liquid crystal driving circuits is stopped. In a liquid crystal display device using an OCB cell, if the power-saving function is effected to stop the operation of liquid crystal driving circuits, the liquid crystal is changed to a splay orientation state from a bend orientation state. Therefore, to allow instantaneous start of display in returning the computer to normal mode from the power-saving mode in response to a certain input, in a liquid crystal display device using an OCB cell only the backlight should be turned off while the driving is continued as in the normal mode.

Figure 11:
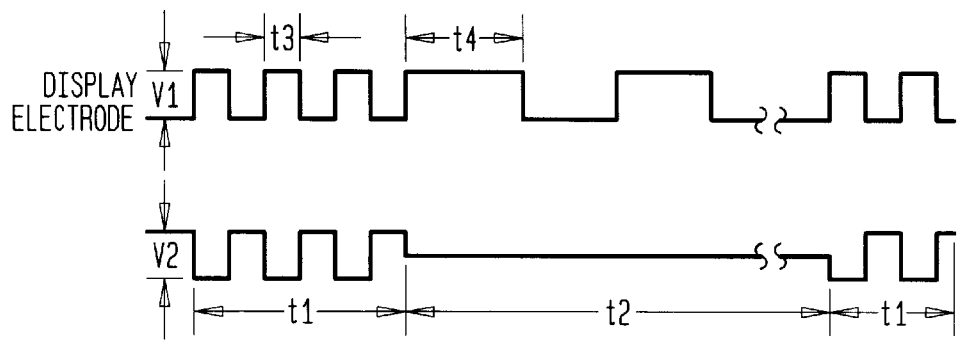
FIG. 11 shows a driving method during a power-saving mode of a system.
Figure 12:
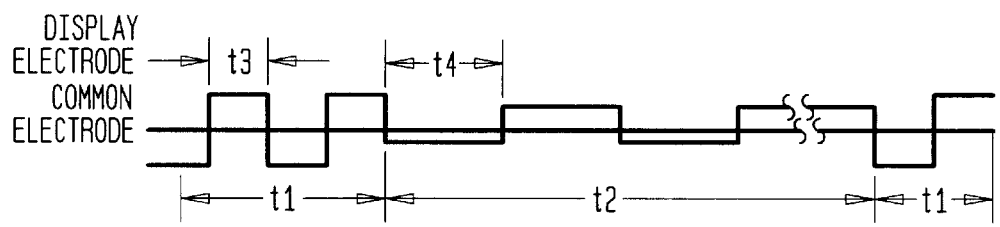
FIG. 12 shows another driving method during the power-saving mode of the system.
Figure 13:
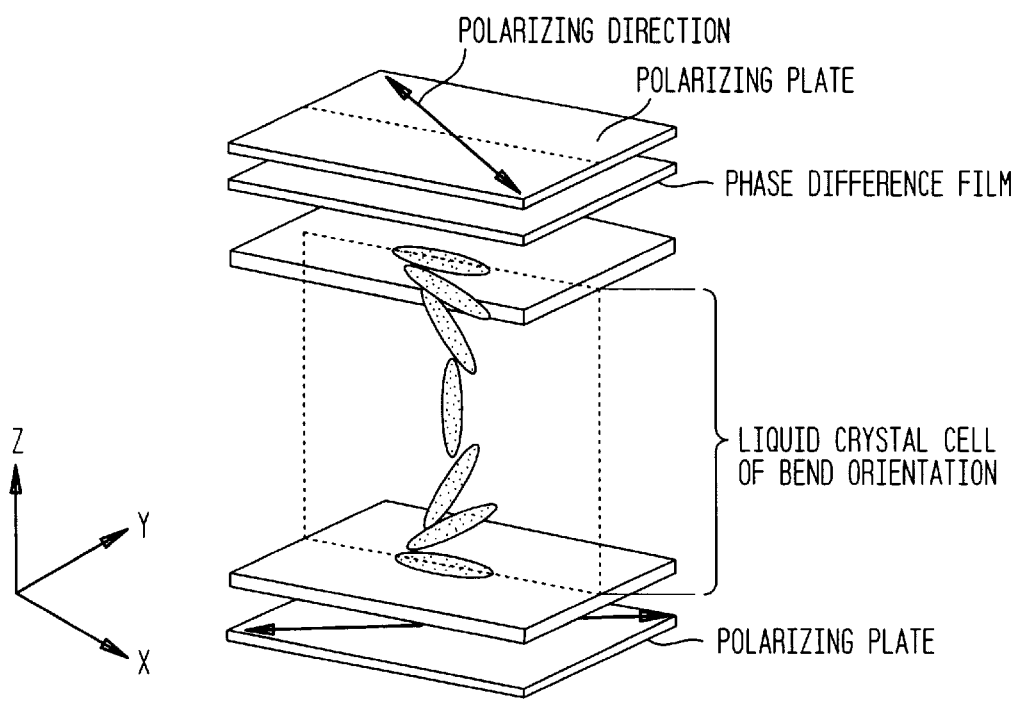
FIG. 13 illustrates a structure of an OCB cell.

To this end, in a liquid crystal display device using an OCB cell, driving as shown in FIG. 11 or 12 is performed in the power-saving mode.

FIG. 11 shows examples of drive waveforms for the display electrodes and the common electrode in the case of common electrode inversion driving. In the common electrode inversion driving, the voltages to the common electrode and the display electrodes are inverted repeatedly every horizontal period (t3). During a period t1 in the figure, drive waveforms of an ordinary display period are applied. A voltage applied to a pixel of the liquid crystal is V1/2+V2/2, where V1 and V2 are amplitudes of voltages applied to the display electrode and the common electrode, respectively.

During a power-saving period t2, the common electrode inversion is stopped, and a voltage applied to a pixel is V1/V2, which is set higher than a voltage for prohibiting transfer from bend orientation to splay orientation. Usually, this voltage is set at 5 V or less. During this period, an inversion period t4 is set longer than one horizontal period, preferably several hertz to several tens of hertz. With this setting, no power is needed for the common electrode inversion. Further, since the inversion period of the display electrodes becomes longer, the power consumption at the display electrodes can be reduced by a factor of t3/t4.

FIG. 12 shows examples of drive waveforms in a case where a constant voltage is applied to the common electrode. Voltages to the display electrodes are repeatedly inverted every horizontal period t3. During a period t1 in the figure, drive waveforms of an ordinary display period are applied. A voltage applied to a pixel of the liquid crystal is V1/2, where V1 is an amplitude of a voltage applied to the display electrode during a display period.

During a power-saving period t2, the amplitude of voltages applied to the display electrodes is set at V2, where V1 is set larger than V2. During this period, a voltage applied to the liquid crystal is V2/2, which is set higher than a voltage for prohibiting transfer from bend orientation to splay orientation. During this period, an inversion period t4 is set longer than one horizontal period, preferably several hertz to several tens of hertz. With this setting, the power consumption can be reduced because the amplitude of the voltages applied to the display electrodes is made smaller. Further, since the inversion period of the display electrodes becomes longer, and the power consumption at the display electrodes can be reduced by a factor of t3/t4.

According to the invention, transfer from splay orientation to bend orientation can be effected in short time by controlling the drive timing of the gate electrodes, the display electrodes, and the common electrode while almost no alterations are made of the configuration of the conventional TFT liquid crystal display device.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. A driving method of a liquid crystal display device using an OCB cell, characterized by the steps of:

controlling gate on/off periods of a TFT before applying a voltage for a display operation, each period being longer than a corresponding gate on/off period when applying a voltage for said display operation;

causing each pixel to have bend orientation by a strong electric field that is generated between a gate electrode of the TFT and a common electrode; and applying, at the same time, a voltage that is higher than that to generate an electric field necessary to maintain bend orientation between a display electrode and the common electrode, to thereby effect transfer to bend orientation in short time.

2. A driving method of a liquid crystal display device using an OCB cell, characterized by the steps of:

applying voltage pulses between a storage capacitance electrode of a TFT and a common electrode prior to a start of a display operation, said voltage pulses generated at a frequency lower than that of corresponding voltage pulses when applying a voltage for said display operation;

causing each pixel to have bend orientation by a strong electric field that is generated between the electrode of the TFT and the common electrode; and applying, at the same time, a voltage that is higher then that to generate an electric field necessary to maintain bend orientation between a display electrode and the common electrode, to thereby effect transfer to bend orientation in short time.

3. The driving method of a liquid crystal display device according to claim 1, characterized in that the display operation is started in response to a power-on reset signal sent from a system side.

4. The driving method of a liquid crystal display device according to claim 2, characterized in that the display operation is started in response to a power-on reset signal sent from a system side.

5. A driving method of a liquid crystal display device using an OCB cell, characterized by the steps of:

controlling gate on/off periods of a TFT at a given time interval before a display operation, each period being longer than a corresponding gate on/off period when applying a voltage for said display operation;

causing each pixel to have bend orientation by a strong electric field that is generated between a gate electrode of the TFT and a common electrode; and applying, at the same time, a voltage that is higher than that to generate an electric field necessary to maintain bend orientation between a display electrode and the common electrode, to thereby effect transfer to bend orientation in short time.

6. A driving method of a liquid crystal display device using an OCB cell, characterized by the steps of:

applying voltage pulses between a storage capacitance electrode of a TFT and a common electrode at a given time interval before a display operation, said voltage pulses generated at a frequency lower than that of corresponding voltage pulses when applying a voltage for said display operation;

causing each pixel to have bend orientation by a strong electric field that is generated between the electrode of the TFT and the common electrode; and applying, at the same time, a voltage that is higher than to generate an electric field necessary to maintain bend orientation between a display electrode and the common electrode, to thereby effect transfer to bend orientation in short time.

7. The driving method of a liquid crystal display device according to claim 5, characterized by the step of applying a voltage pulse between the storage capacitance electrode of the TFT and the common electrode at an arbitrary time point instead of at the given time interval, to thereby effect transfer to bend orientation forcibly.

8. The driving method of a liquid crystal display device according to claim 6, characterized by the step of applying a voltage pulse between the storage capacitance electrode of the TFT and the common electrode at an arbitrary time point instead of at the given time interval, to thereby effect transfer to bend orientation forcibly.

9. A driving method of a liquid crystal display device using an OCB cell, characterized by the steps of:

applying, between a common electrode and a display electrode, a minimum voltage that is necessary to maintain the OCB cell bend orientation at a start of and during suspension of a display operation; and generating said minimum voltage at a frame frequency lower than that of corresponding frame frequency when applying voltage during said display operation, to thereby maintain a bend orientation state during suspension of a display operation.

* * * * *

UNITED STATES PATENT AND TRADEMARK OFFICE
CERTIFICATE OF CORRECTION

PATENT NO. : 6,069,620
DATED : May 30, 2000
INVENTOR(S) : Hajime Nakumura, et al.

It is certified that error appears in the above-identified patent and that said Letters Patent are hereby corrected as shown below:

```
On The Title Page, [56] Refernces Cited, U.S. PATENT DOCUMENTS:
                      "2/1995
                       7/1996
                       9/1997"
should read           --3/1993
                       3/1994
                       2/1995--

Column 3, Line 52: "an" should read --a--
```

Signed and Sealed this

Fifteenth Day of May, 2001

Attest:

NICHOLAS P. GODICI

*Attesting Officer*    *Acting Director of the United States Patent and Trademark Office*